(12) United States Patent
Park et al.

(10) Patent No.: US 9,747,144 B2
(45) Date of Patent: Aug. 29, 2017

(54) FUNCTION PROCESSING APPARATUS AND FUNCTION PROCESSING METHOD DYNAMICALLY PROCESS NETWORK FUNCTION USING COMMANDS

(71) Applicant: Electronics and Telecommunications Research Institute, Daejeon (KR)

(72) Inventors: Pyung Koo Park, Daejeon (KR); Hyub Woo Jeon, Daejeon (KR); Ho Yong Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/191,024

(22) Filed: Jun. 23, 2016

(65) Prior Publication Data

US 2017/0123868 A1 May 4, 2017

(30) Foreign Application Priority Data

Nov. 4, 2015 (KR) .......................... 10-2015-0154508

(51) Int. Cl.
*G06F 3/00* (2006.01)
*G06F 9/44* (2006.01)
(Continued)

(52) U.S. Cl.
CPC .............. *G06F 9/546* (2013.01); *G06F 9/547* (2013.01); *G06F 17/30327* (2013.01)

(58) Field of Classification Search
USPC ........................................................ 719/313
See application file for complete search history.

(56) References Cited

U.S. PATENT DOCUMENTS 6,697,754 B1 * 2/2004 Alexander ............. G01R 13/22
702/119
8,051,105 B1 * 11/2011 Johnson ............ G06F 17/30327
707/798
(Continued)

FOREIGN PATENT DOCUMENTS

KR    10-2003-0083491 A    10/2003

OTHER PUBLICATIONS

Jeon, Hyub Woo "N2OS Command Manager_Developer Guide_ version 0.1", Jun. 27, 2014, 38 pages.

*Primary Examiner* — Tuan Dao
*Assistant Examiner* — William C Wood
(74) *Attorney, Agent, or Firm* — Nelson Mullins Riley & Scarborough LLP

(57) ABSTRACT

There are provided a function processing apparatus and function processing method dynamically process network function using commands. A function processing apparatus includes a communication unit for performing communication with at least one user interface and at least one software component, and a controller for, if first command related information is received from the at least one software component, forming a command tree on the basis of the first command related information and transmitting the first command related information to the at least one user interface, and, if second command related information is received from at least one user interface, transmitting the second command related information to a software component corresponding to the second command related information.

8 Claims, 10 Drawing Sheets

(51) Int. Cl.
*G06F 9/46* (2006.01)
*G06F 13/00* (2006.01)
*G06F 9/54* (2006.01)
*G06F 17/30* (2006.01)

(56) References Cited

U.S. PATENT DOCUMENTS

| | | | | |
|---|---|---|---|---|
| 2003/0192042 | A1* | 10/2003 | Takemoto | G06F 9/4415 717/177 |
| 2008/0046873 | A1* | 2/2008 | Rumsey | G06F 9/44505 717/143 |
| 2010/0242096 | A1* | 9/2010 | Varadharajan | H04L 63/029 726/4 |
| 2013/0298205 | A1* | 11/2013 | O'Connor | G06F 21/53 726/4 |
| 2015/0180777 | A1 | 6/2015 | Shin et al. | |

* cited by examiner

FUNCTION PROCESSING APPARATUS AND FUNCTION PROCESSING METHOD DYNAMICALLY PROCESS NETWORK FUNCTION USING COMMANDS

CROSS-REFERENCE TO RELATED APPLICATION

The present application claims priority to Korean patent application number 10-2015-0154508 filed on Nov. 4, 2015 the entire disclosure of which is incorporated herein in its entirety by reference.

BACKGROUND

1. Field

An aspect of the present disclosure relates to a function processing apparatus and function processing method dynamically process network function using commands.

2. Description of the Related Art

In a general command processing mechanism, a command is determined at a point of time when software and hardware components receiving the command are compiled. Therefore, there is an inconvenience that, if a command is to be added or changed in the operation of a service, the corresponding service should be temporarily stopped.

SUMMARY

Embodiments provide a function processing apparatus and function processing method dynamically process network function using commands, in which a command can be dynamically added/deleted/changed without stopping a service during the operation of the service.

Embodiments provide a function processing apparatus and function processing method dynamically process network function using commands, in which, when a command is added/deleted/changed, only a component in which the command is added/deleted/changed can be re-started without stopping the entire service.

According to an aspect of the present disclosure, there is provided a function processing apparatus including: a communication unit configured to perform communication with at least one user interface and at least one software component; and a controller configured to, if first command related information is received from the at least one software component, form a command tree on the basis of the first command related information and transmit the first command related information to the at least one user interface, and, if second command related information is received from at least one user interface, transmit the second command related information to a software component corresponding to the second command related information.

According to an aspect of the present disclosure, there is provided a function processing method including: a registration process of, if first command related information is received from at least one software component, forming a command tree on the basis of the first command related information and transmitting the first command related information to at least one user interface; and an execution process of, if second command related information is received from the at least one user interface, transmitting the second command related information to a software component corresponding to the second command related information.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The present disclosure now will be described more fully hereinafter with reference to the accompanying drawings, in which embodiments of the present disclosure are shown. The present disclosure should not be construed as limited to the embodiments set forth herein. Rather, these embodiments are provided so that this disclosure will be thorough and complete, and will fully convey the scope of the present disclosure to those skilled in the art.

It will be further understood that the terms "includes" and/or "including", when used in this specification, specify the presence of stated features, integers, steps, operations, elements, and/or components, but do not preclude the presence and/or addition of one or more other features, integers, steps, operations, elements, components, and/or groups thereof.

As used herein, the singular forms are intended to include the plural forms as well, unless the context clearly indicates otherwise.

Hereinafter, exemplary embodiments of the present disclosure will be described in detail with reference to the accompanying drawings.

Figure 1:
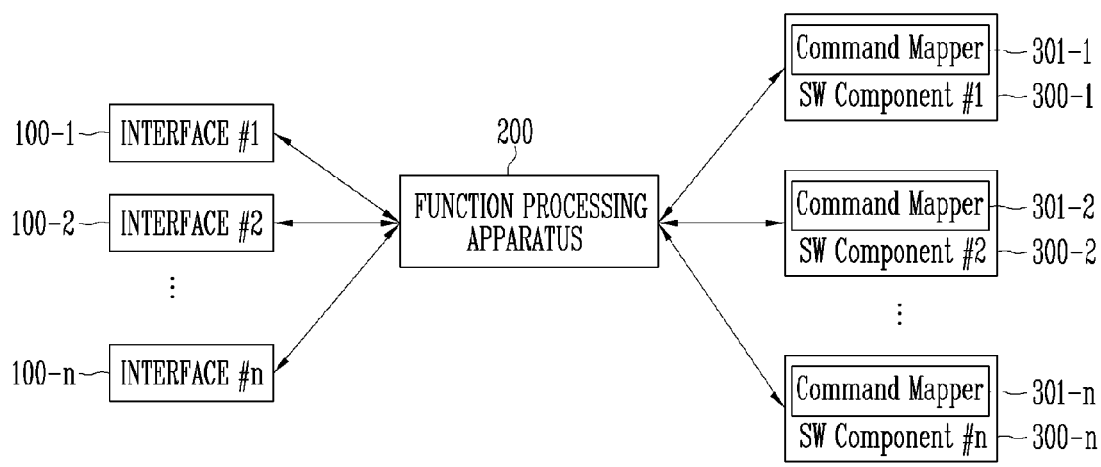
FIG. 1 is a diagram illustrating a structure of a system in which a function processing apparatus is operated according to the present disclosure.

FIG. 1 is a diagram illustrating a structure of a system in which a function processing apparatus is operated according to the present disclosure.

Referring to FIG. 1, the system to which the present disclosure is applied includes at least one user interface 100-1, 100-2, . . . , 100-n, a function processing apparatus 200, and at least one software component 300-1, 300-2, . . . , 300-n.

The at least one user interface 100-1, 100-2, . . . , 100-n is a component that receives a command input from a system operator. In various embodiments, 100-1, 100-2, . . . , 100-n may be cluster manager shell interfaces (CMSHs). Hereinafter, a case where the at least one user interface 100-1, 100-2, . . . , 100-n is a CMSH will described as an example, but the present disclosure may be applied systems using various user interfaces without departing from the spirit and scope of the present disclosure.

In various embodiments, the at least one user interface 100-1, 100-2, . . . , 100-n is connected to the function processing apparatus 200 in an initialization stage, to receive command related information on the at least one software component 300-1, 300-2, . . . , 300-n through the function processing apparatus 200, thereby form a command tree. In this case, the at least one user interface 100-1, 100-2, . . . , 100-n may be connected to the function processing apparatus 200 through TCP, UDP, Raw IP, Unix domain socket, etc. The command tree may include a software component identifier (ID), a command ID, a help string, etc., which correspond to a corresponding command. This will be described in detail below.

In various embodiments, if a command is input from a system operator, the at least one user interface 100-1, 100-2, . . . , 100-n may transmit command related information corresponding to the input command to the function processing apparatus 200, using a command tree, to allow the command to be executed in a corresponding software component.

The function processing apparatus 200 manages the at least one user interface 100-1, 100-2, . . . , 100-n and the at least one software component 300-1, 300-2, . . . , 300-n. In various embodiments, the function processing apparatus 200 may be called as a command manager.

The function processing apparatus 200 includes a communication unit for transmitting/receiving data to/from the at least one user interface 100-1, 100-2, . . . , 100-n and the at least one software component 300-1, 300-2, . . . , 300-n, and a controller for controlling operations of the function processing apparatus 200. Hereinafter, various operations of the controller will be described.

In various embodiments, the function processing apparatus 200 may receive command related information from the respective at least one software component 300-1, 300-2, . . . , 300-n, thereby forming a command tree. Also, the function processing apparatus 200 may transmit the received command related information to the at least one user interface 100-1, 100-2, . . . , 100-n, so that each of the at least one user interface 100-1, 100-2, . . . , 100-n can form its own command tree.

In this case, the function processing apparatus 200 may change a mode of the at least one user interface 100-1, 100-2, . . . , 100-n. In various embodiments, the at least one user interface 100-1, 100-2, . . . , 100-n may be operated, according to rights, in a view mode in which a fundamental system general status can be checked, a config mode in which a command can be executed, or an enable mode in which a system operation status can be checked in a state in which the execution of a command is stopped. The function processing apparatus 200 may transmit command related information to the at least one user interface 100-1, 100-2, . . . , 100-n such that the mode of a user interface being operated in the config mode among the at least one user interface 100-1, 100-2, . . . , 100-n is changed to the enable mode so as to prevent a command from being executed while the at least one user interface 100-1, 100-2, . . . , 100-n are forming a command tree.

In various embodiments, if command related information is received from the at least one user interface 100-1, 100-2, . . . , 100-n, the function processing apparatus 200 may transmit the received command related information to a software component corresponding to the received command related information. The function processing apparatus 200 functions to simply forward the received command related information to the corresponding software component.

The at least one software component 300-1, 300-2, . . . , 300-n maps a command that it can execute and a function corresponding to the corresponding command, and execute the command. To this end, the at least one software component 300-1, 300-2, . . . , 300-n may include at least one command mapper 301-1, 301-2, . . . , 301-n.

In various embodiments, the at least one software component 300-1, 300-2, . . . , 300-n may assigns an identifier (ID) to a command through the at least one command mapper 301-1, 301-2, . . . , 301-n, and map a function corresponding to the command, thereby forming mapping information. The at least one software component 300-1, 300-2, . . . , 300-n transmits, to the function processing apparatus 200, command related information on the command mapped to the function, so that the function processing apparatus 200 and the at least one user interface 100-1, 100-2, . . . , 100-n connected thereto can form a command tree.

In various embodiments, if command related information is received from the command processing apparatus 200 through the at least one command mapper 301-1, 301-2, . . . , 301-n, the at least one software component 300-1, 300-2, . . . , 300-n may determine a command corresponding to the command related information, using mapping information, and execute a function corresponding to the determined command. Specifically, the at least one software component 300-1, 300-2, . . . , 300-n may determine a mapped function by searching a command ID included in command related information from mapping information, and execute the determined function.

Hereinafter, a function processing method of the function processing apparatus 200 according to the present disclosure will be described in detail.

The function processing method according to the present disclosure may include a 'registration process' in which the function apparatus 200 forms its own command tree using command related information received from the at least one software component 300-1, 300-2, . . . , 300-n, and transmits the command related information to the at least one user interface 100-1, 100-2, . . . , 100-n, so that the respective user interfaces form a command tree, and an 'execution process' in which the function apparatus 200 transmits the command related information received from the at least one user interface 100-1, 100-2, . . . , 100-n to a corresponding software component, so that a command is executed.

Figure 2:
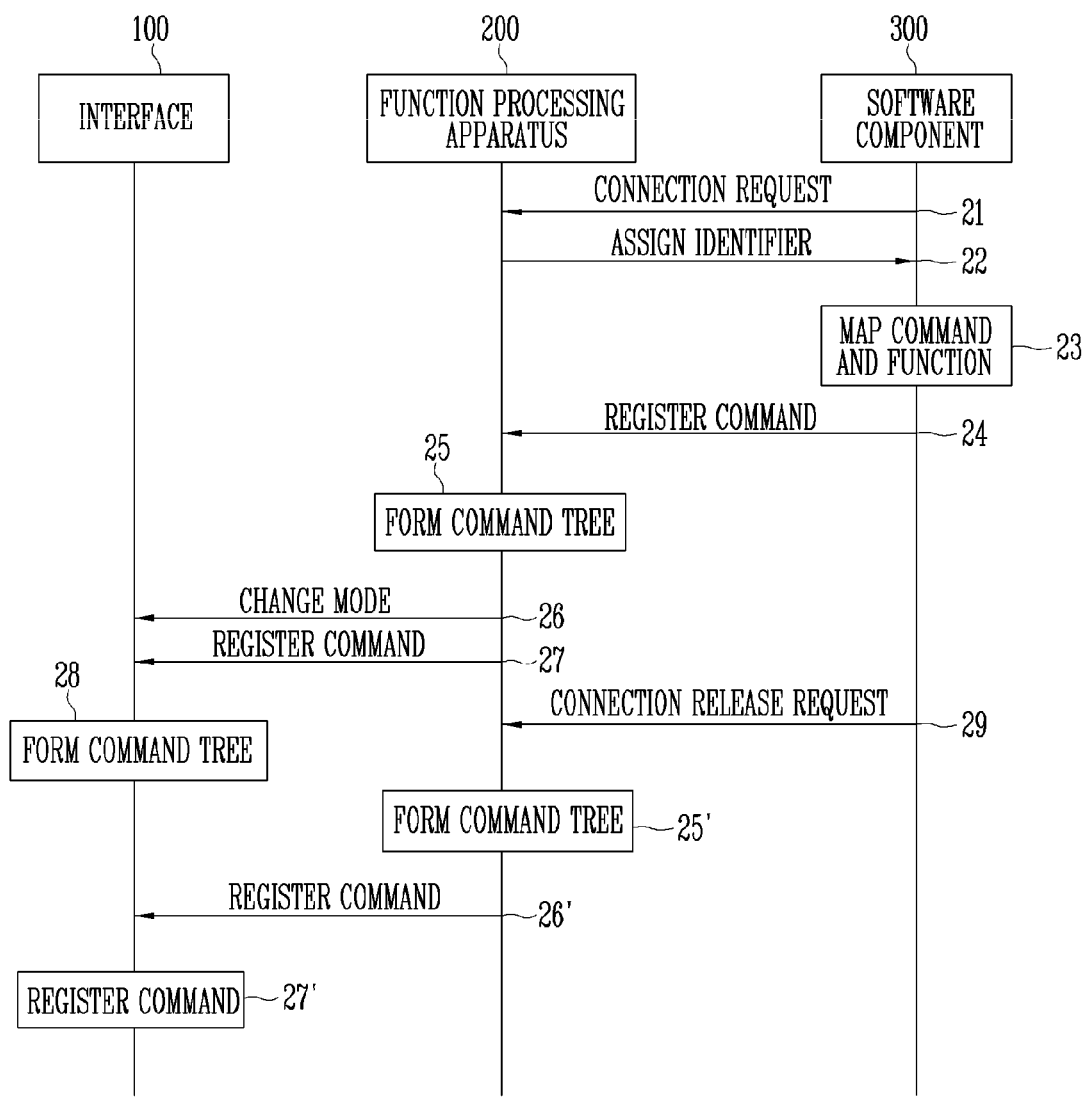
FIG. 2 is a flowchart illustrating a registration process in a function processing method according to the present disclosure.

FIG. 2 is a flowchart illustrating the registration process in the function processing method according to the present disclosure.

Referring to FIG. 2, the function processing apparatus 200 according to the present disclosure receives a connection request from a software component 300 (21). The function processing apparatus 200 may receive the connection request that the software component 300 transmits so as to be connected to the function processing apparatus 200.

The function processing apparatus 200 may assign an identifier to the software component 300 in response to the received connection request (22). Here, the identifier is used to identify the software component 300. The identifier may be used to, when a specific command is executed by a user interface 100, identify the software component 300 capable of executing the corresponding command.

If the software component 300 is connected to the function processing apparatus 200, the software component 300 maps a command and a function corresponding to the command (23). The software component 300 assigns a command identifier to the command through a command mapper 301, and maps a function corresponding to the command in a pointer format, thereby forming mapping information between the command identifier and the corresponding function.

The mapping information may be configured as shown in the following Table 1.

TABLE 1

| Command ID #1 | Command ID #2 | . . . |
|---|---|---|
| Function pointer | Function pointer | . . . |
| Other parameters | Other parameters | . . . |

After that, the software component 300 transmits the command identifier and the mapping information to the function processing apparatus 200, thereby registering command related information (24). The software component 300 may transmit, to the function processing apparatus 200, information required to form a command tree of the function processing apparatus 200, in addition to the command identifier and the mapping information.

The function processing apparatus 200 forms a command tree using the information received from the software component 300 (25). When there is a previously formed command tree, the function processing apparatus 200 may update the command tree.

Also, the function processing apparatus 200 may transmit the received information to the user interface 100 such that the user interface 100 can form a command tree. At this time, the function processing apparatus 200 is to be previously connected to the user interface 100 in response to a connection request of the user interface 100.

The user interface 100 may be operated in a config mode for executing a command. In order to prevent a command from being executed by the user interface 100 being operated in the config mode during the registration process, the function processing apparatus 200 may change the mode of the user interface 100 being operated in the config mode to an enable mode (26). After that, the function processing apparatus 200 may transmit, to the user interface 100, the information received from the software component 300 or command related information generated based on its own command tree (27). In this case, the command related information may include a command identifier and mapping information. Alternatively, the command related information is information required for the user interface 100 to form a command tree, and may further include a software component identifier, a help string, etc. with respect to the corresponding command.

The user interface 100 forms a command tree using the information received from the function processing apparatus 200 (28). When there is a previously formed command tree, the user interface 100 may update the command tree.

When command registration is completed, the software component 300 may transmit a connection release request to the function processing apparatus 200 (29).

If the connection release request is received from the software component 300, the function processing apparatus 200 may release the connection to the software component 300 and form a command tree according to the release of the connection to the corresponding software component 300 (25'). In an embodiment, the command tree according to the release of the connection may be formed by deleting, from the command tree, command related information of a command executable in the corresponding software component 300.

Also, the function processing apparatus 200 transmits, to the user interface, the command related information according to the release of the connection to the software component 300 (26'), so that the user interface 100 can form the command tree according to the release of the connection to the corresponding software component 300 (27').

Additionally, the function processing apparatus 200 may change the mode of the user interface 100 being operated in the enable mode to the config mode so as to form a command tree.

Figure 3:
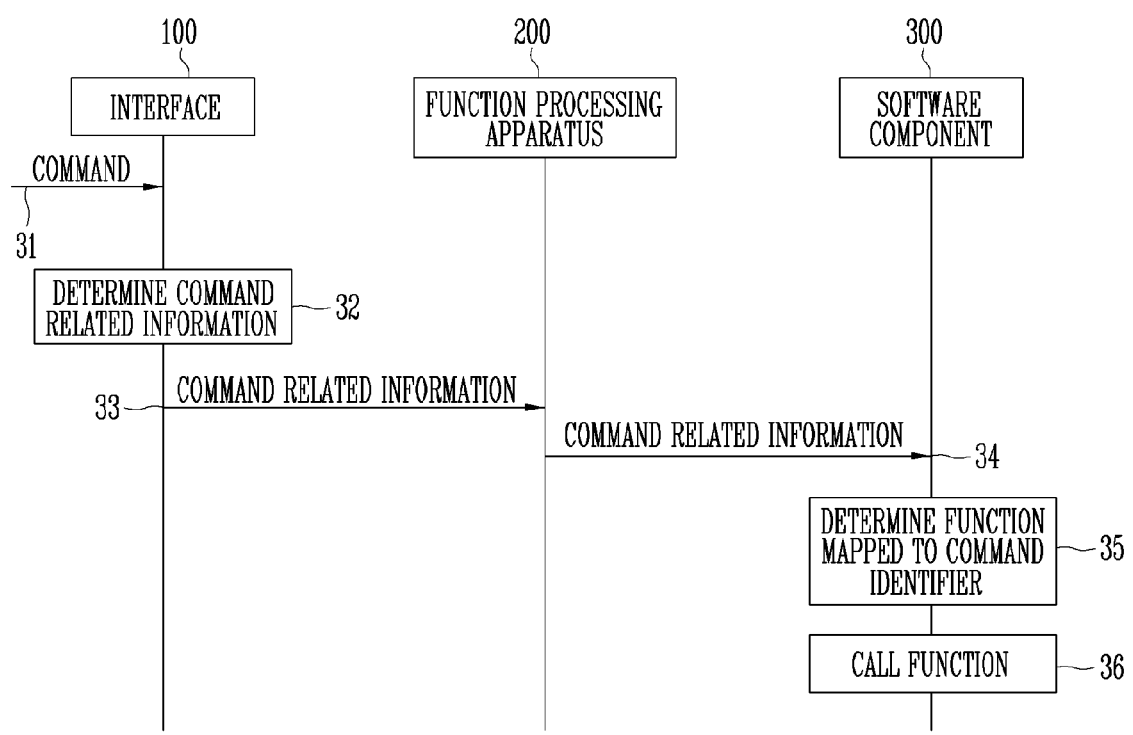
FIG. 3 is a flowchart illustrating an execution process in the function processing method according to the present disclosure.

FIG. 3 is a flowchart illustrating the execution process in the function processing method according to the present disclosure. The execution process according to FIG. 3 is performed in a state in which, after a command tree is formed through the registration process according to FIG. 2, the user interface 100 and the software component 300 are connected to the function processing apparatus 200. In the execution process according to FIG. 3, the user interface 100 may be operated in the config mode.

Referring to FIG. 3, if a command is input from a system operator (31), the user interface 100 determines command related information corresponding to the input command, using a command tree (32). The user interface 100 may search a command tree for each token of a command, thereby determining command related information corresponding to the command, e.g., a software component identifier, a command identifier, etc., corresponding to the input command.

The user interface 100 transmits the determined command related information to the function processing apparatus 200 (33). The function processing apparatus 200 receiving the command related information transmits the command related information to a software component 300 corresponding to the software component identifier included in the command related information (34).

Here, the transmitted command related information may be node command related information 602 (or general command related information 603) described with reference to FIG. 6. Hereinafter, the command related information is dynamically configured to be transmitted as described with reference to FIGS. 8 to 10, and its detailed description will be described with reference to FIGS. 8 to 10.

In order to determine the software component 300 corresponding to the software component identifier included in the command related information, the function processing apparatus 200 may use a previously configured node or may previously store separate mapping information between the command identifier and the software component identifier. The mapping information between the command identifier and the software component identifier may be configured as shown in the following Table 2. In Table 2, CMSH refers to a user interface of FIG. 1.

TABLE 2

| Sender | Command identifier | Software component |
|---|---|---|
| CMSH #1 | Command ID #1 | Component #1 |
| CMSH #2 | Command ID #2 | Component #2 |
| ... | ... | ... |

The software component 300 receiving the command related information determines a function mapped to the command identifier included in the command related information, using previously stored command identifiers and mapping information thereof (35).

After that, the software component 300 calls the determined function, thereby executing the command (36).

In the above-described function processing method of FIGS. 2 and 3, operations of the software component 300 may be performed by the command mapper 301, and the subject of the operations is not limited as long as it is included in the software component 300 or is a component corresponding to the software component 300.

Figure 4:
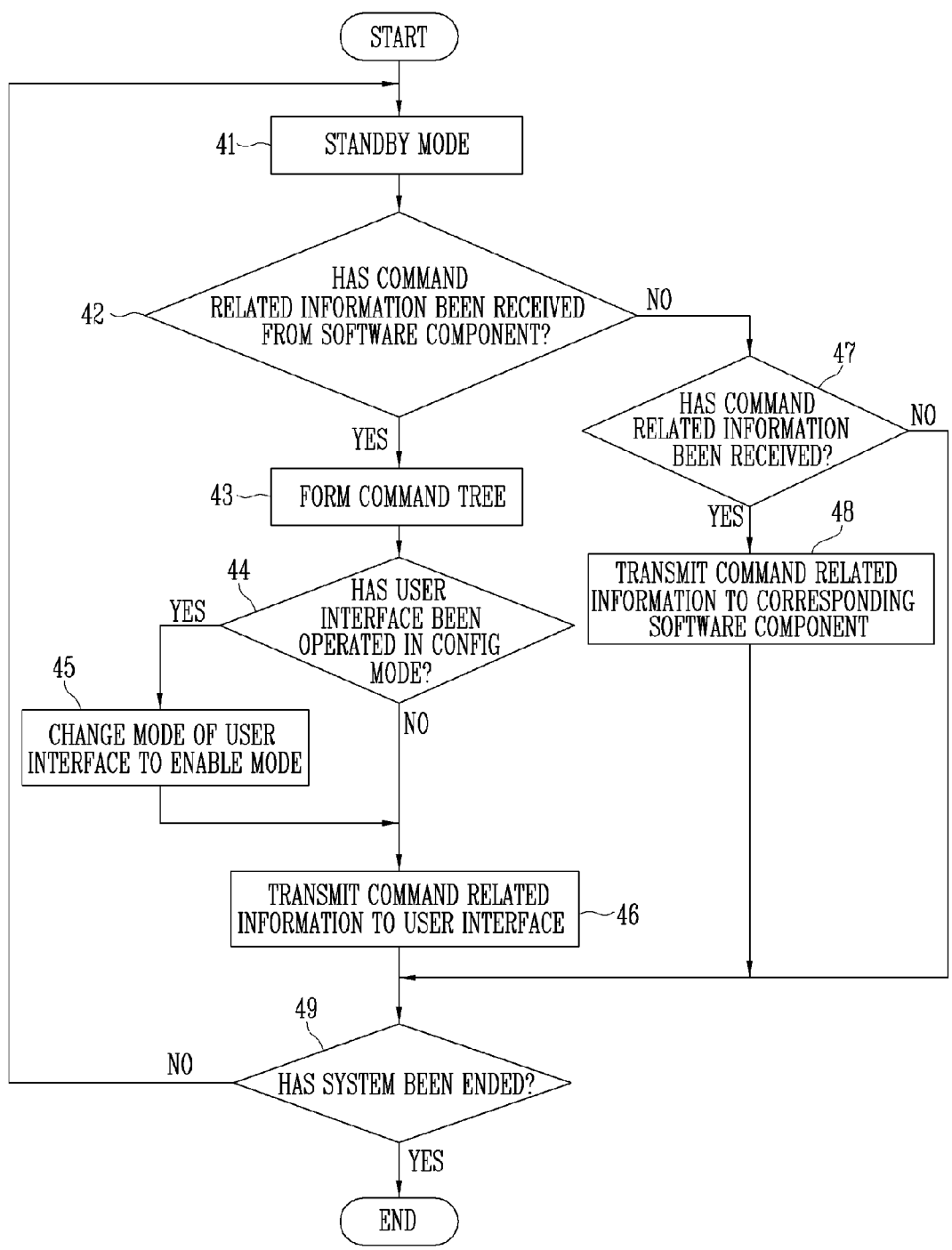
FIG. 4 is a flowchart illustrating the function processing method according to the present disclosure.

FIG. 4 is a flowchart illustrating the function processing method according to the present disclosure.

Referring to FIG. 4, the function processing apparatus 200 according to the present disclosure may be first operated in a standby mode (41). The function processing apparatus 200 in the standby mode may be connected to the user interface 100 and the software component 300.

In an embodiment, if a connection request is received from the software component 300, the function processing apparatus 200 may assign a software component identifier to the software component 300.

If command related information is received from the software component 300 in the standby mode (42), the function processing apparatus 200 forms a command tree on the basis of the received command related information (43). The command related information received from the software component 300 may include, for example, a software component identifier, a command identifier, mapping information with a function corresponding to a command, etc. The command tree may include software component identifiers, command identifiers, mapping information with functions corresponding to commands, help strings, etc. with respect to the respective commands.

Next, the function processing apparatus 200 determines whether the user interface 100 connected to the function processing apparatus 200 is operated in a config mode (44), and changes the mode of the user interface 100 operated in the config mode to an enable mode (45).

After that, the function processing apparatus 200 transmits the received command related information to the user interface 100, so that the user interface 100 can form a command tree. In an embodiment, the function processing apparatus 200 may generate command related information on the basis of its own command tree and transmit the generated command related information to the user interface 100. The command related information transmitted from the function processing apparatus 200 to the user interface 100 may include, for example, a software component identifier, a command identifier, mapping information with a function corresponding to a command, a help string, etc.

In an embodiment, if command related information is received from the user interface 100 (47), the function processing apparatus 200 transmits the command related information to a software component 300 corresponding to a software component identifier included in the command related information (48).

After that, the function processing apparatus 200 returns to the standby mode to repeatedly perform the above-described operations until it is determined that the system has been ended (49).

Hereinafter, a detailed structure of a command tree formed by the function processing apparatus 200 will be described.

Figure 5:
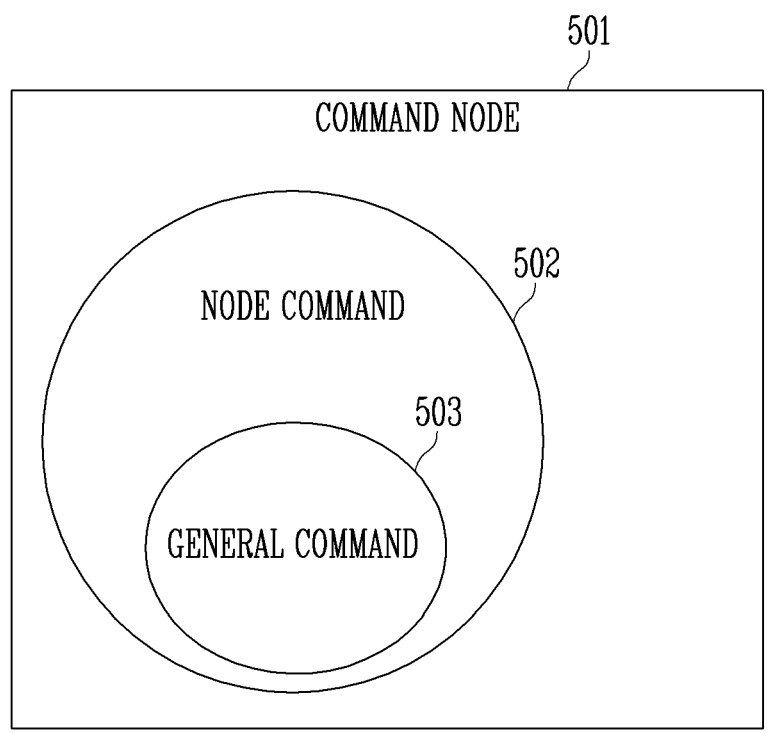
FIG. 5 is a diagram illustrating a command system.

FIG. 5 is a diagram illustrating a command system.

In various embodiments, the system may support, according to rights, a view mode in which a fundamental system general status can be checked, a config mode in which a command can be executed, or an enable mode in which a system operation status can be checked in a state in which the execution of a command is stopped.

Accordingly, the command system includes commands to be used by the user interface 100 in the respective modes. Referring to FIG. 5, each mode forms one upper node 501 in a command tree. For example, the command tree may include a view node, a config node, and an enable node.

Each upper node 501 may include a node command 502 that enables a command to enter into a mode corresponding to the corresponding upper node 501 and a general command 503 that enables a command to enter into the corresponding mode and to be executed. The node command 502 may include "mode name"+"terminal."

The commands are grouped for each node 501 in the command tree, based on a mode in which a corresponding command is executable. That is, a command executable in the config mode is added as a lower node of the config node.

In an embodiment, when a command "ping" is to be executed in the config mode, a system operator may input the node command 502 called as "config terminal" to enter into the config mode, and input the general command 503 called as "ping" to enable the corresponding command to be executed.

Hereinafter, a structure of a command tree formed based on the above-described command system will be described in detail.

Figure 6:
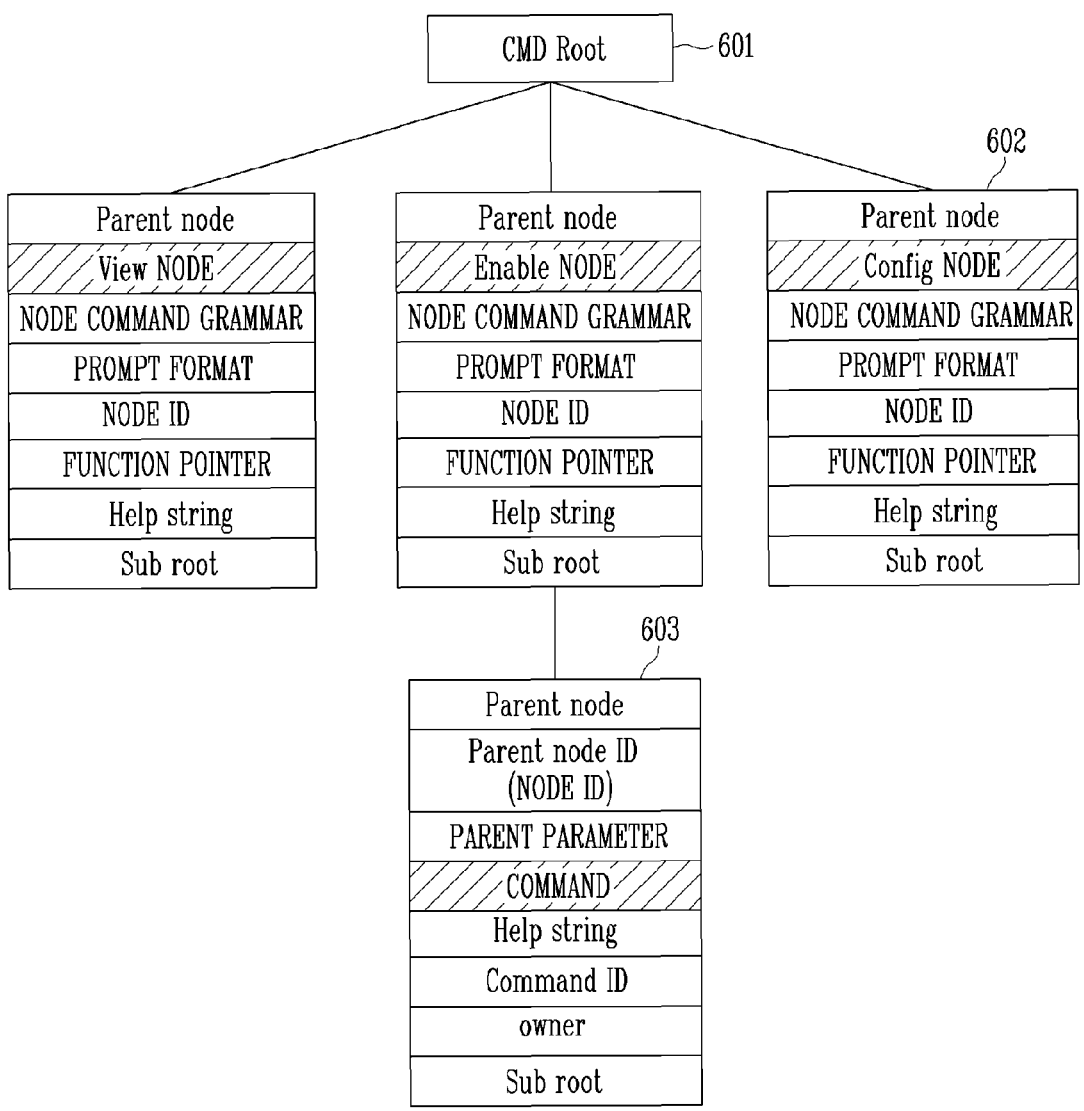
FIG. 6 is a diagram illustrating a basic configuration of a command tree according to the present disclosure.

FIG. 6 is a diagram illustrating a basic configuration of a command tree according to the present disclosure.

Referring to FIG. 6, the command tree includes a node command node 602 under a root node 601 and a general command node 603 added as a lower node of the node command node 602. The node command node 602 and the general command node 603 may be disposed within the command tree in an order of tokens constituting a command received from the software component 300.

The node command node 602 and the general command node 603 include command related information on a node command a general command, respectively. The command related information on the node command may include a node command grammar, an output format of a prompt output in the entry into a corresponding node, a node identifier, a help string, etc. The command related information on the general command may include a node identifier, an upper node related parameter (e.g., an upper node identifier), a general command grammar, a command identifier, software component information, e.g., a software component identifier (owner) corresponding to a command, mapping information, a help string, etc.

An example of the command tree configured as described above is illustrated in FIG. 7.

Figure 7:
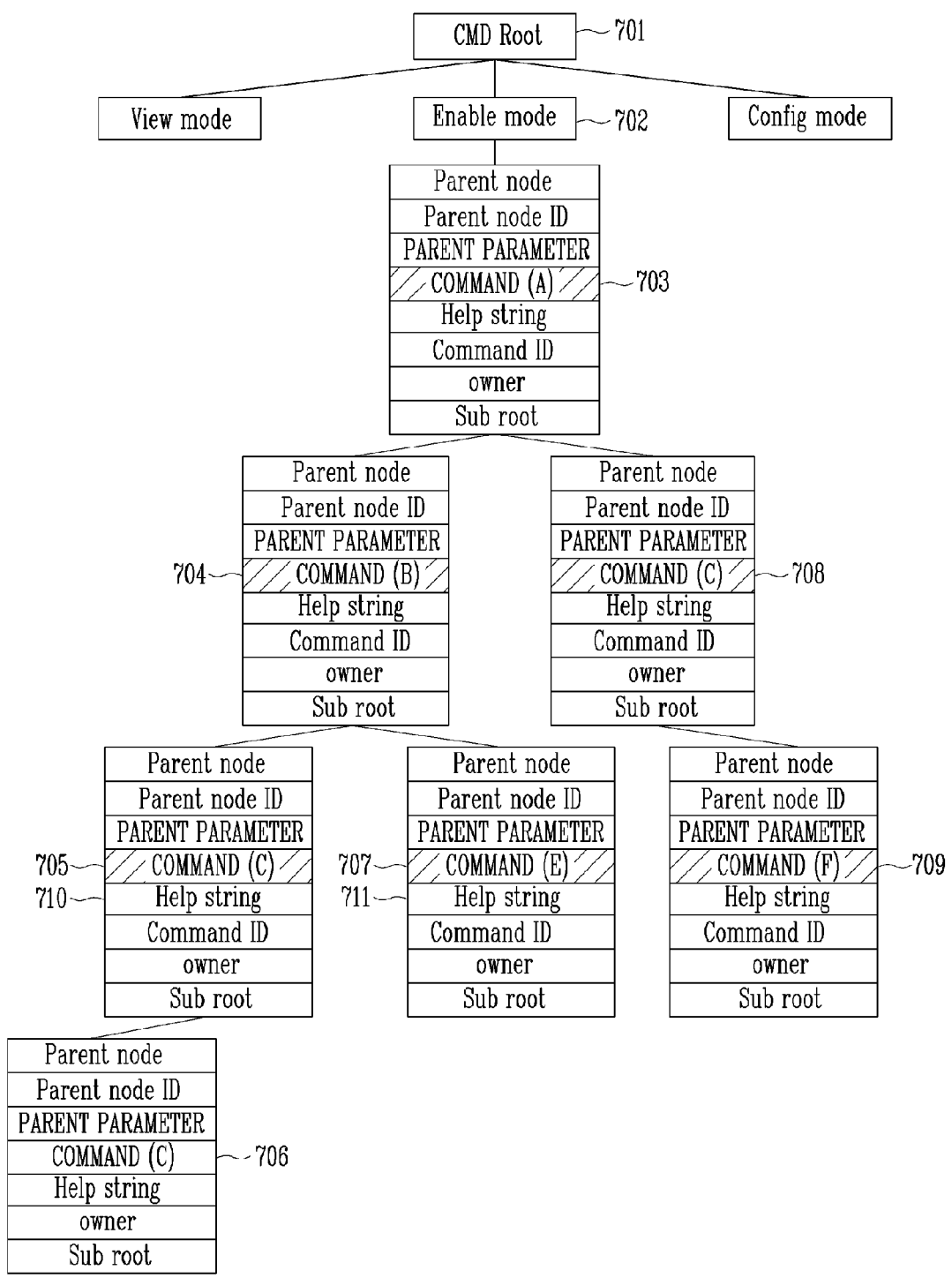
FIG. 7 is a diagram illustrating an example of the command tree.

In an embodiment, when commands executed in the software component 300 are [A B C D], [A B E], and [A C F], the command tree may be configured as shown in FIG. 7.

Specifically, the command tree may be configured to sequentially include general command nodes 703, 704, 705, and 706 respectively corresponding to tokens A, B, C, and D under a node command node 702, corresponding to the command [A B C D]. Also, the command tree may be configured to sequentially include general command node 703, 704, and 707 respectively corresponding to tokens A, B, and E under the node command node 702, corresponding to the command [A B E]. Also, the command tree may be configured to sequentially include general command nodes 703, 708, and 709 respectively corresponding to tokens A, C, and F under the node command node 702, corresponding to the command [A C F].

According to the command tree, a command executable next to an arbitrary node command (token) is previously set according to the command tree. Therefore, a help string may include information on a general command executable next to the corresponding general command, and the user interface 100 (or the function processing apparatus 200) helps a system manager to determine an executable general command by outputting the help string to the system manager. For example, when the general command B is input, the user interface 100 may output help strings 710 and 711 of the commands C and E of the general command nodes 705 and 707 disposed as lower nodes of the general command node 704. If there is no general command disposed in the lower nodes of the general command node 704, the user interface 100 determines an output value as '0,' and may not complete command search. A command identifier may include a command identifier of a general command of which performance has been finally completed.

Figure 8:
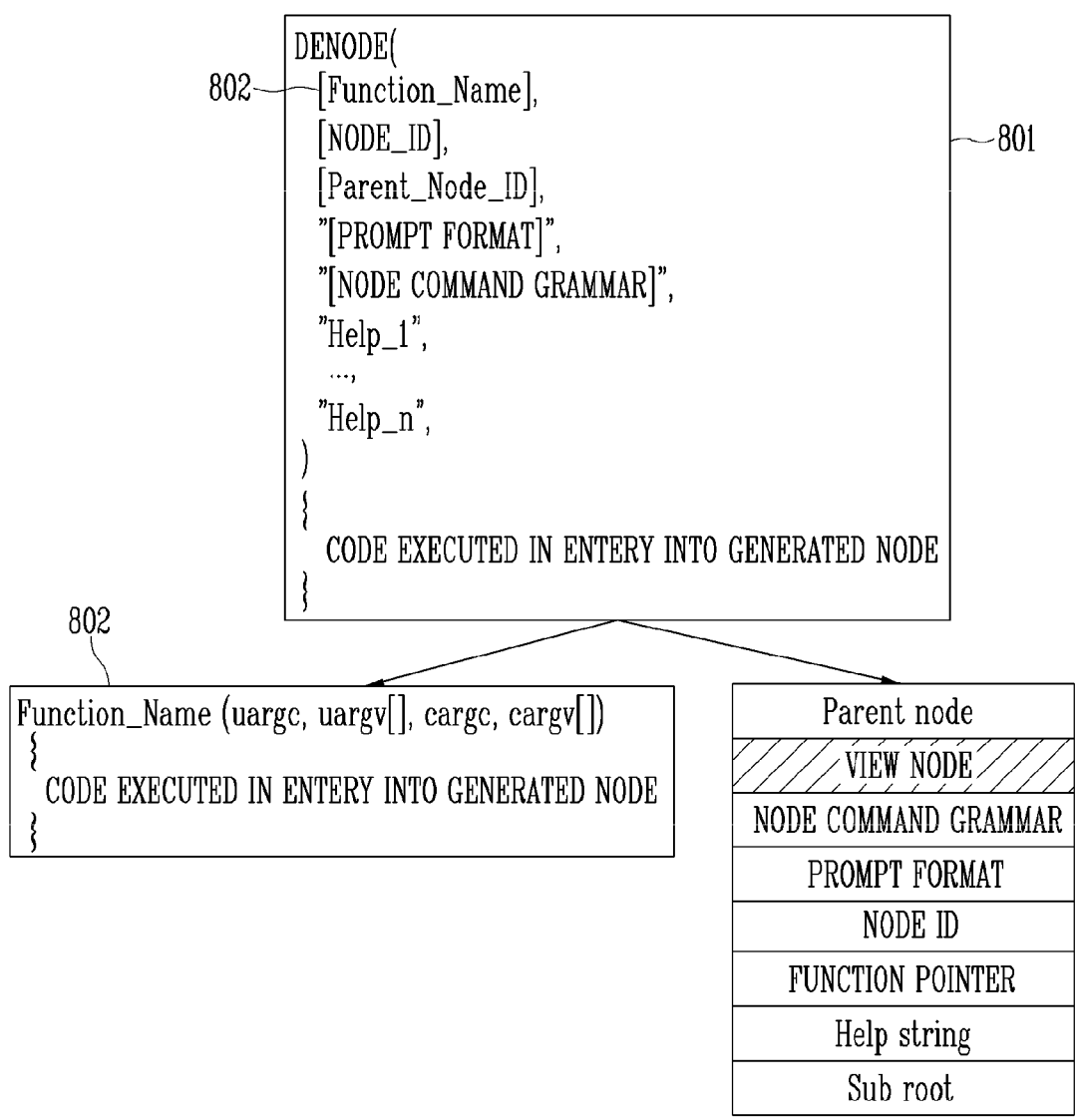
FIG. 8 is a diagram illustrating a configuration of a node command node in the command tree according to the present disclosure.

FIG. 8 is a diagram illustrating a configuration of the node command node in the command tree according to the present disclosure.

In various embodiments, the node command node 602 may be configured in the function processing apparatus 200. When a command tree is formed based on command related information received from the software component 300, it is to be previously recognized in which mode a command is executed, i.e., in which node the command is to be disposed. Hence, the node command node 602 is previously configured in the function processing apparatus 200.

A node command definition 801 constituting the node command node 602 may include macros including all information for forming command related information on the node command 502. The macro is changed into the format of a function 802 that can be called as shown in FIG. 8, to transmit a parameter together with a command. Here, the parameter may include upper node information and a current command parameter.

Figure 9:
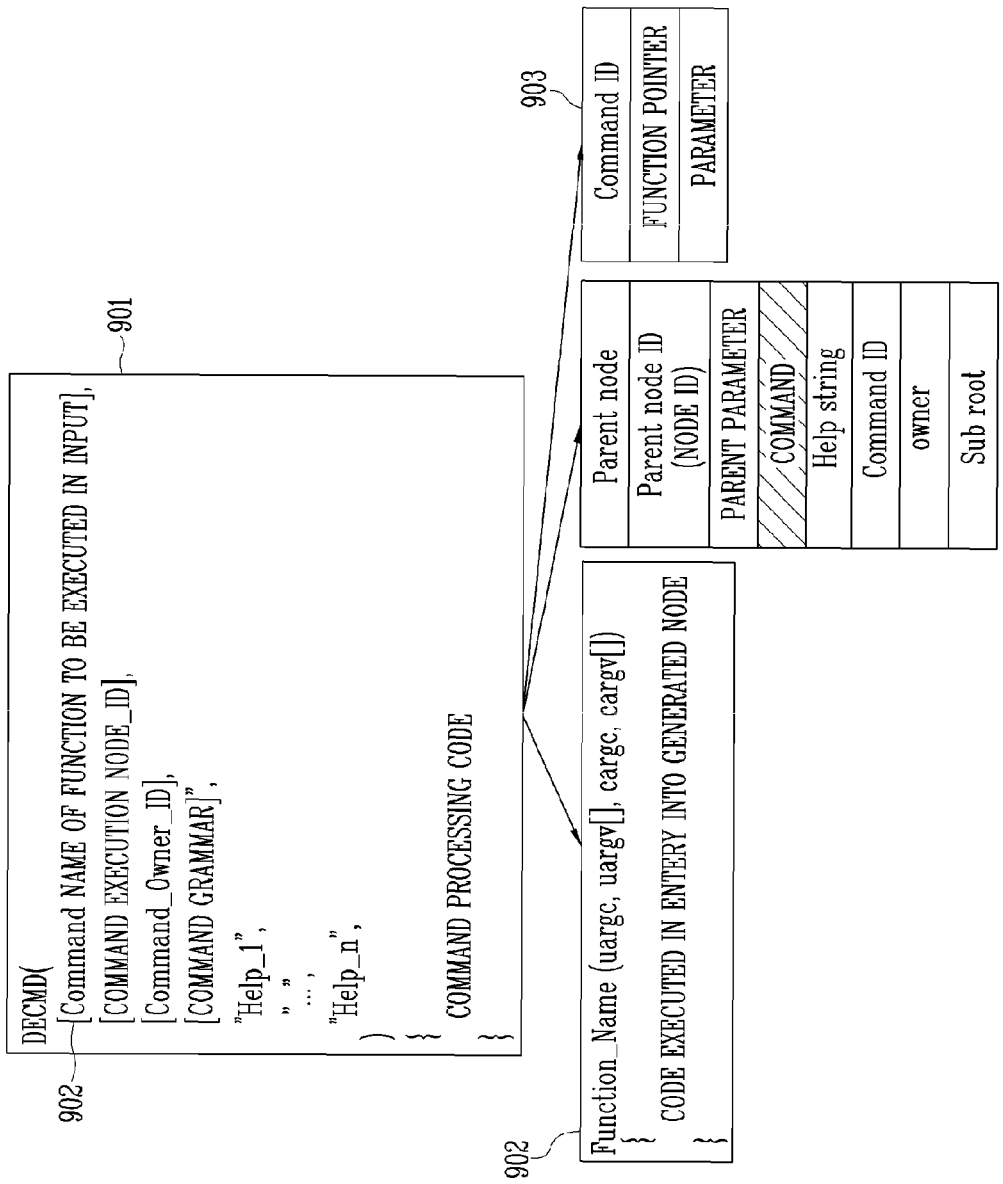
FIG. 9 is a diagram illustrating a configuration of a general command node in the command tree according to the present disclosure.

FIG. 9 is a diagram illustrating a configuration of the general command node in the command tree according to the present disclosure.

A general command definition 901 constituting the general command node 603 may be defined in the software component 300 to receive a general command. The command tree may be formed based on the general command definition 901. Therefore, the command tree may include a command identifier and mapping information, based on the general command definition 901.

A registered command is changed into the format of a callable function 902 that can be called by a macro. The command mapper 301 may store mapping information 903 including a command identifier and a function pointer corresponding thereto.

Figure 10:
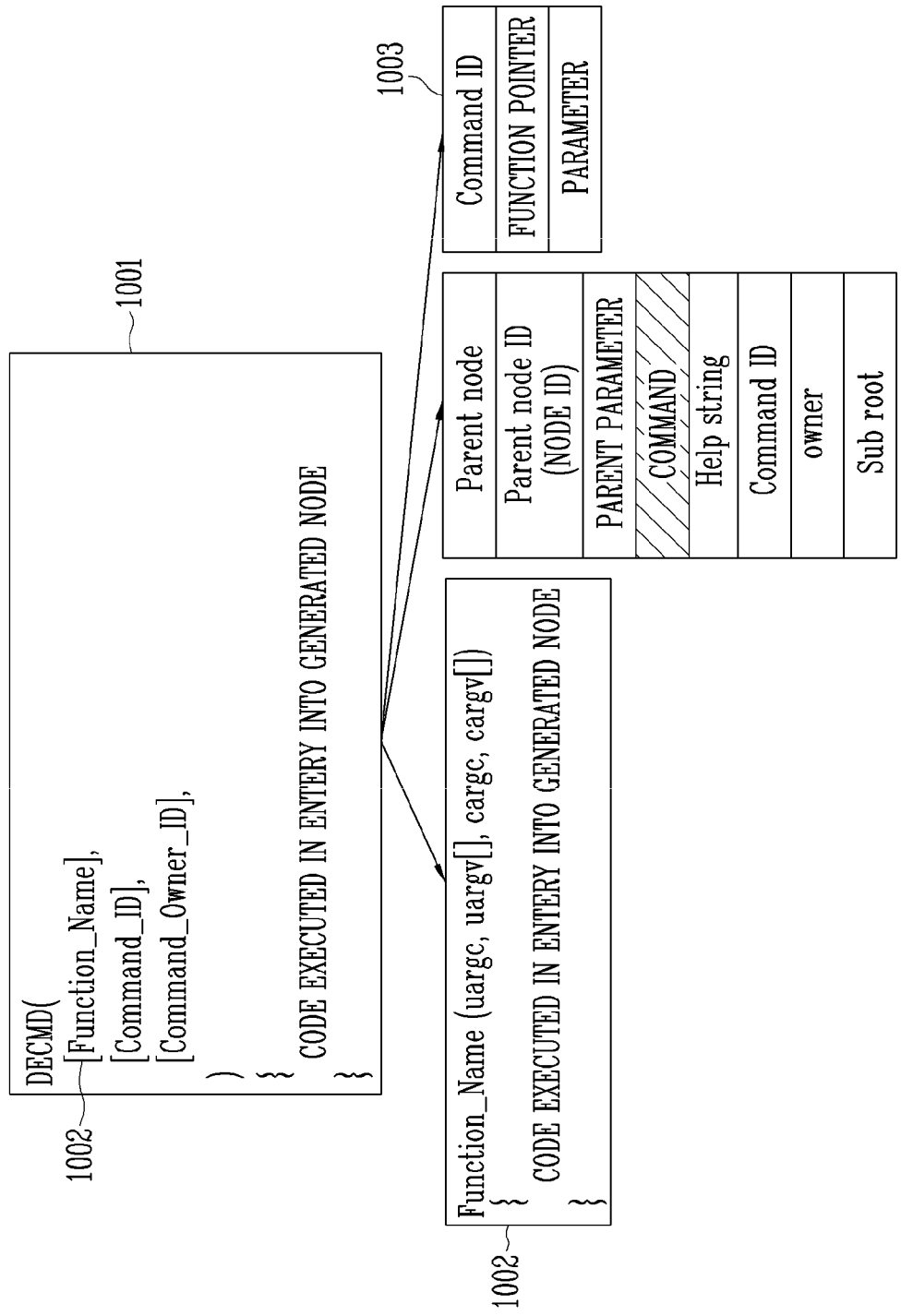
FIG. 10 is a diagram illustrating a registration method of a node command processing function according to an embodiment of the present disclosure.

FIG. 10 is a diagram illustrating a registration method of a node command processing function according to an embodiment of the present disclosure.

In an embodiment, it is assumed that a node command "interface [interface_name]" and a general command "ip address" are set in a config node. Specifically, if it is assumed that a general command called as "ip address A. B. C. D" is disposed as a lower general command in a node command called as "interface eth0," there may occur a case where any one of the software components 300 is to process only the general command "ip address A. B. C. D" and another of the software components 300 is to simultaneously process the general command "ip address A. B. C. D" and the node command "interface eth0."

In order to solve this, since the node command is defined in the function processing apparatus 200, each software component 300 may register, in advance, a function 1002 to be performed when the node command is called. In this case, the function processing apparatus 200 transmits a command identifier to the software component 300 in the entry into a corresponding node, and enables the stored function 1002 to be called based on the transmitted command identifier. The command mapper 301 included in the software component 300 may simultaneously store a command identifier and mapping information.

In the function processing apparatus and the function processing method, a command can be dynamically added/deleted/changed in the system during the operation of a service, thereby ensuring the continuity of the service.

In the function processing apparatus and the function processing method, even when the software component dynamically added to a hardware device, the function of the added software component can be processed through dynamic command processing.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A function processing method comprising:
a registration process of, if first command related information is received from at least one software component, forming a command tree on the basis of the first command related information and transmitting the first command related information to at least one user interface; and
an execution process of, if second command related information is received from the at least one user interface, transmitting the second command related information to a software component corresponding to the second command related information,
wherein the registration process includes:
changing, to a command execution stop mode, the mode of a user interface being operated in a command execution mode among the at least one user interface; and transmitting the first command related information to the at least one user, and wherein commands are grouped for each node in the command tree, based on a mode including the command execution stop mode and the command execution mode in which a corresponding command is executable.

2. The function processing method of claim 1, wherein the first command related information includes information on a command identifier assigned to a command by the at least one software component and mapping information on a function mapped to the command identifier.

3. The function processing method of claim 1, wherein the second command related information includes a command identifier and a software component identifier corresponding to the command identifier.

4. The function processing method of claim 1, wherein the execution process includes:

if second command related information is received from the at least one user interface, determining a software component identifier corresponding to the second command related information on the basis of the command tree; and transmitting the second command related information to a software component corresponding to the software component identifier.

5. The function processing method of claim 1, wherein the command tree includes a plurality of node command nodes and a plurality of general command nodes added as lower nodes of the plurality of node command nodes.

6. The function processing method of claim 5, wherein the plurality of node command nodes include command related information on a node command including at least one of a node command grammar, a prompt output format, a node identifier, and a help string, and the plurality of general command node include command related information on a general command including at least one of a node identifier, an upper node related parameter, a general command grammar, a command identifier, software component information corresponding to the command identifier, mapping information on a function mapped to the command identifier, and a help string.

7. The function processing method of claim 5, wherein the plurality of node command nodes include a node command definition that changes a macro including the command related information on the node command into the format of a callable function.

8. The function processing method of claim 5, wherein the plurality of general command nodes include a general command definition that changes a macro including the command related information on the general command and the mapping information into the format of a callable function.

* * * * *